US007644868B2

(12) United States Patent
Hare

(10) Patent No.: US 7,644,868 B2
(45) Date of Patent: Jan. 12, 2010

(54) USER IDENTITY SECURITY SYSTEM FOR COMPUTER-BASED ACCOUNT ACCESS

(76) Inventor: William D. Hare, 3 Anderson La., Princeton, NJ (US) 08540

( * ) Notice: Subject to any disclaimer, the term of this patent is extended or adjusted under 35 U.S.C. 154(b) by 295 days.

(21) Appl. No.: 11/620,639

(22) Filed: Jan. 5, 2007

(65) Prior Publication Data
US 2007/0157299 A1 Jul. 5, 2007

Related U.S. Application Data

(60) Provisional application No. 60/806,792, filed on Jul. 10, 2006, provisional application No. 60/766,252, filed on Jan. 5, 2006.

(51) Int. Cl.
*G06K 19/06* (2006.01)
(52) U.S. Cl. ............................ 235/494; 726/9; 726/19; 713/183; 713/201; 713/202
(58) Field of Classification Search ................. 235/494; 726/9, 19; 713/183, 201, 202
See application file for complete search history.

(56) References Cited

U.S. PATENT DOCUMENTS

| | | | |
|---|---|---|---|
| 2002/0108046 A1* | 8/2002 | Armingaud | 713/183 |
| 2004/0243845 A1* | 12/2004 | Larsen | 713/201 |
| 2005/0055581 A1* | 3/2005 | Larsen | 713/202 |

* cited by examiner

*Primary Examiner*—Allyson N Trail
(74) *Attorney, Agent, or Firm*—McNeely & Harell; William D. Hare

(57) ABSTRACT

The inventions relate to security systems for securely accessing accounts and avoiding identity-theft scams. They include object-based passwords and passphrases. For example, the invention relates to method of verifying a user's identity to allow that user to gain access to an account. The method includes creating a first matrix of characters of size X; and upon logon, displaying a second matrix of characters of size Z, wherein Y characters represent a preselected password of the user and X>Z>Y. In this equation, X is greater than the number of letters, numbers and characters on a keyboard.

16 Claims, 2 Drawing Sheets

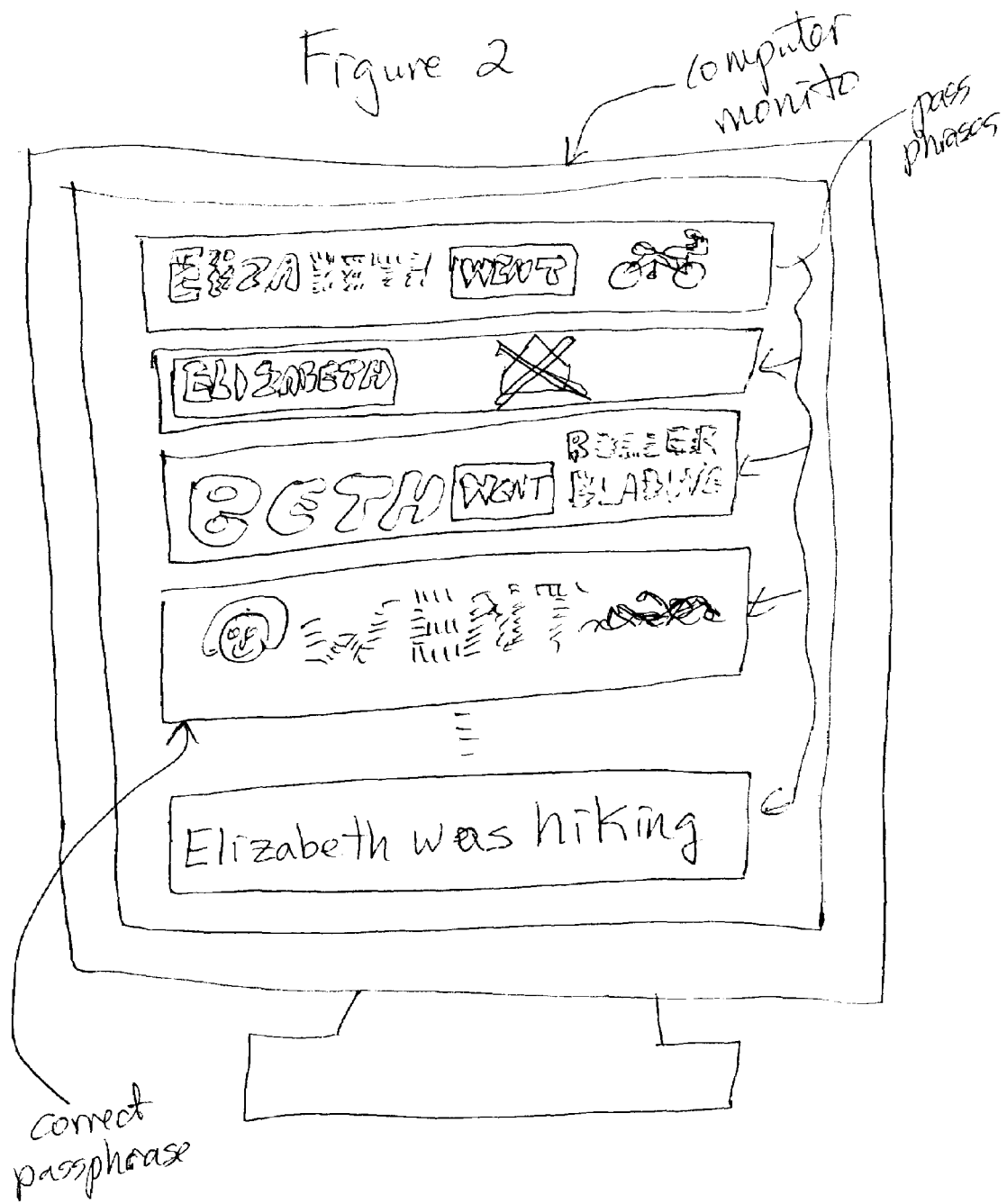

ic information when that information is entered on the user's computer.

USER IDENTITY SECURITY SYSTEM FOR COMPUTER-BASED ACCOUNT ACCESS

RELATED APPLICATIONS

This application claims priority from provisional patent application No. 60/806,792 filed on Jul. 10, 2006, titled "User Identity Security System for Computer-Based Account Access using Graphics, Passwords and Passphrases" and provisional patent application No. 60/766,252 filed on Jan. 5, 2006, titled "User Identity Security System for Computer-Based Account Access." The contents of the entirety of both are incorporated herein by reference.

TECHNICAL FIELD OF THE INVENTION

The technical field of the invention relates to security systems for securely accessing accounts and avoiding identity-theft scams.

BACKGROUND OF THE INVENTION

There is a need to improve the security of commerce over the Internet, for example, in commerce that involves finances such as stocks, bonds, cash, credit cards, bank accounts, and brokerage accounts. Programs have been developed to monitor key strokes and send people to faux websites designed to look like a legitimate institution, e.g., financial; both programs are designed for the purpose of capturing password information to either commit identity theft or break into the account.

SUMMARY OF THE INVENTION

In one general aspect there is provided a method for verifying a user's identity to allow that user to gain access to an account. The method includes:
creating a matrix of symbols stored on a first computer based on matrix positions/cell coordinates of each symbol, wherein an identifier of the user's identity is represented by less than all of the symbols in the matrix;
transmitting the matrix of symbols and, optionally, matrix positions/cell coordinates to a second computer;
presenting the matrix of symbols to a user of a second computer wishing to gain access to an account through the second computer, the matrix being presented as clickable cells configured to be clicked by a computer device;
transmitting to the first computer the matrix positions/cell coordinates of the cells clicked by the user; and
comparing the matrix positions/cell coordinates transmitted by the second computer to the matrix positions/cell coordinates stored on the first computer to determine if the identifier of the user's identity was correctly entered.

The method can be implemented on a computer or computer-based system.

In another general aspect there is provided a method of verifying a user's identity to allow that user to gain access to an account, the method comprising:
creating a first matrix of characters of size X; and
upon logon, displaying a second matrix of characters of size Z, wherein Y characters represent a preselected password of the user and X>Z>Y,
wherein X>the number of letters, numbers and characters on a keyboard.

Embodiments of the method may include one or more of the following features. For example, the matrix of characters X may be greater than 72. The matrix of symbols X may be greater than 98. The matrix of symbols X may be greater than 110.

The probability, P, that the password will be presented in the second matrix may be determined by $P=[C(Y,Y)C(X-Y, Z-Y)]/C(X,Z)$.

In the method, the matrix of symbols X may be greater than 100. The matrix of symbols may be greater than 150.

In another general aspect there is provided a method of verifying a user's identity to allow that user to gain access, the method comprising:
setting a passphrase for the user;
presenting a display of one or more passphrases, wherein the one or more passphrases comprises the set passphrase and one or more alternative passphrases;
allowing the user to select a passphrase from the one or more passphrases, wherein at least one passphrase is the set passphrase; and
allowing the user to gain access if the selected passphrase matches the set passphrase.

Embodiments of the method may include one or more of the following features. For example, the passphrase may comprise words. The passphrase may comprise objects that form a phrase. The passphrase may comprise words and objects that form a phrase when combined. The passphrase may include graphical objects and/or images.

The alternative passphrases may be configured to be variations on the set passphrase. The variation on the set passphrase may include variation of one or more of a word or object in the set passphrase. The word varied may be one or more of a noun, a verb, an adverb, an adjective or grammatical object.

DESCRIPTION OF THE DRAWINGS

FIG. 2 is a display of a matrix of passphrases.

DETAILED DESCRIPTION OF THE INVENTION

Figure 1:
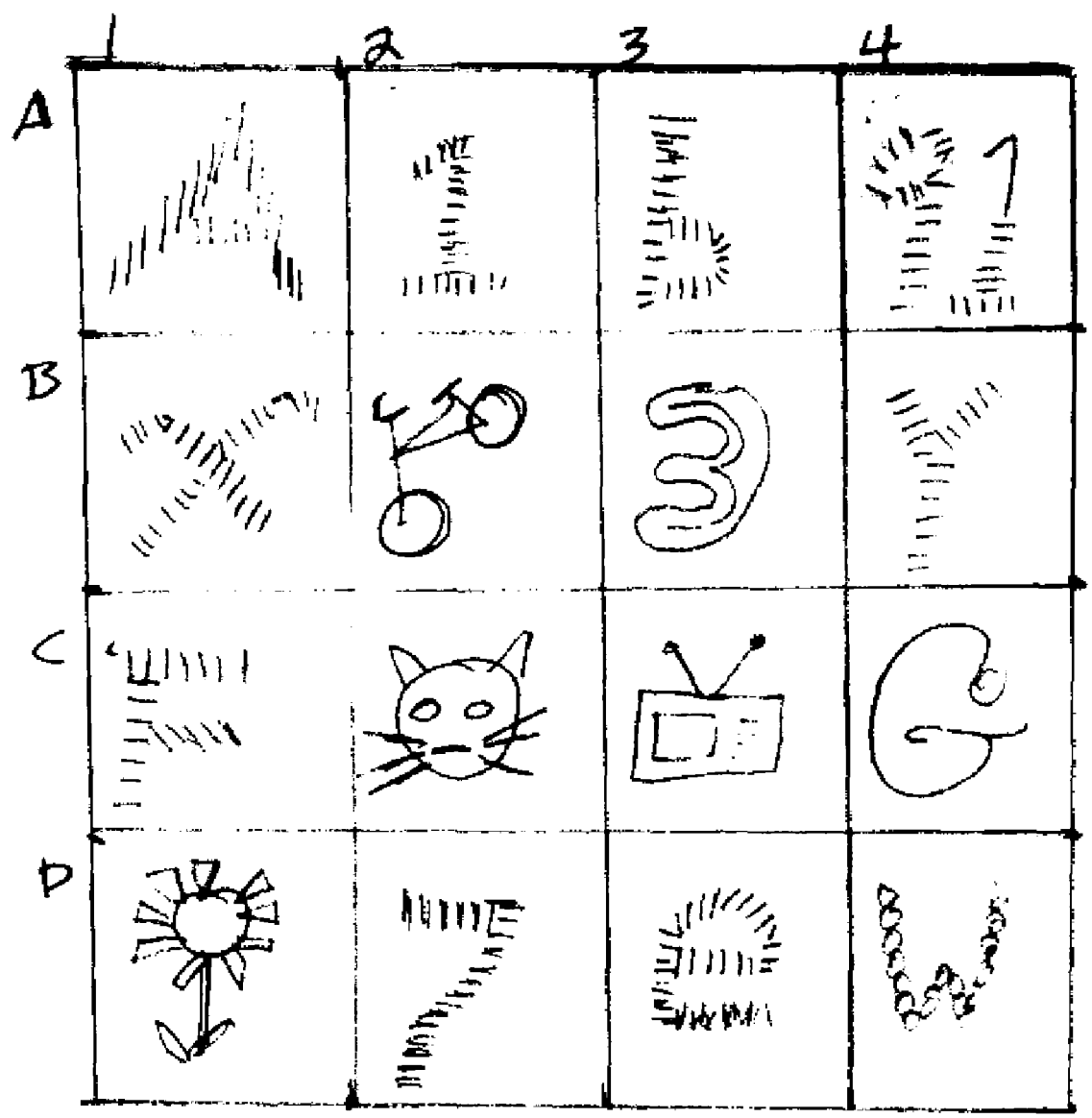
FIG. 1 is a matrix of numbers, letters and symbols.

The system includes a first computer and a second computer. The first computer generally refers to a computer or system operated by or for a first entity (e.g., individual, merchant, corporation, or other organization) which has information, such as an account, that is to be accessed by a second entity (e.g., another individual, merchant, corporation, or organization). The account may be a bank account or stock account held by the first entity but owned by the second entity. The second entity may desire to view information in that account and therefore to view the account needs to gain access to it though the first computer. The access to the first computer may be over, for example, the Internet, by the second computer. In general, to access the first computer, the entity operating the second computer will access the first entity's webpage and be prompted to enter a user id and password. To enter the user id and password, the second entity types letter, numbers, and/or keyboard symbols (e.g., @, #, $, %, &), clicks on a button to transmit that information to the first computer, and that information is transferred over the internet.

While this may work satisfactorily in some cases, scurrilous individuals and organizations may pose as a reputable bank or stock brokerage, send emails to individuals asking them to, for example, click on a link to the bank or brokerage's webpage, and update user id, password, and bank account or stock account information. Unbeknownst to the recipient of the email, the web page opened by the link is not the bank or brokerage but instead a copy of that page which captures the user id, password and account information entered by the individual.

In other, related scenarios, a scurrilous individual or organization may infect someone's computer with a virus that allows transmission of the user id, password, or bank account/ stock account information to that scurrilous individual or organization when the user is actually at the bank or brokerage web page. In both of these scenarios, the user is entering letter, numbers, and/or keyboard symbols from the keyboard which corresponds to computer code (e.g., bits, bytes) that can be intercepted or interpreted by others.

As described in greater detail below, the instant application attempts to avoid this weakness by generally using the transmission of pictures (e.g., images and graphical objects) that do not correspond to easily intercepted and interpreted key board code. Moreover, it further uses the transmission of a matrix code (e.g., column number and row number) that corresponds to a picture at that point in the matrix.

Initially a matrix of symbols is set up on the first computer. The symbols can be in the form of numbers, letters, and objects in the form of an image or picture that is not easily interpreted by a software program but is visually recognizable to an individual viewing the number, letter, or object. FIG. 1 provides an example of a matrix of symbols. Many other configurations are readily apparent from the description herein and are intended to fall within the scope of the inventions.

For example, rather than using standard Times New Roman font with its easily recognizable letter and number, fonts are available on computer that are not easily recognizable because of their distorted shape and size. For example, in Windows Word 2003, fonts such as Baby Kruffy, Alba Super, Chick, Croobie, to name but a few, provide difficult to recognize letters and numbers. Similarly, numbers and letters can be formed such that they are not easily recognizable by software. For example, letters can be made up of horizontal and/or vertical lines or small circles to provide the general outline or silhouette of the letter but not be recognizable by character recognition software. FIG. 1 illustrates letters and numbers made in this manner. Nonetheless, these displayed number and letters generally will be displayed as pictures, images or graphical objects rather than computer code that easily corresponds to the number or letter.

A first matrix of symbols can be a subset of a larger set of symbols. FIG. 1, for example, is an illustration of such a first matrix. The larger set of symbols can be a version of the matrix of FIG. 1 but with all possible symbols included. When the user first desires to set up an account with the first entity, a matrix of the symbols is generated by the first computer and the symbol is stored with its matrix position or cell (row, column) by the first computer. This matrix of symbols may vary each time a user or the same user attempts to obtain an account to increase the complexity and security of initially setting up an account. The matrix of symbols is then transmitted to the second entity's computer and appears as a matrix of symbols. The second entity selects a user id and/or a password from the matrix by using a mouse or other device to click on or otherwise select a symbol, which causes a series of cell coordinates or matrix positions to be transmitted from the second computer to the first computer. The first computer can determine the corresponding symbol from the cell coordinates or matrix positions sent from the second computer by simply comparing the coordinates/positions with the matrix of symbol stored on the first computer. This then can be translated into letters or numbers on the first computer or left in the form of symbol images or pictures.

In the future, when the second entity wishes to view his account he goes to the webpage of the first entity and is presented with a logon screen. The logon screen is generated by the first entity to present a matrix of symbols, images, or pictures. The matrix can be of any number of cells but is limited only in requiring a portion of the cells to contain all of the symbols, images or pictures that make up the second entity's user id and/or password. In addition, the matrix must include addition cells having symbols, images, and pictures that are not part of the user id or password. Optionally, there can be additional occurrences of some or all of the symbols of the password. Thus, the matrix presented to the second entity is that of a matrix in which all of the symbols of his password appear at least once in the cells and other cells have symbols that are unrelated to his password. The two sets of cells can be generated by first randomly assigning the symbols of the password to certain cells and then separately randomly assigning to the remaining cells symbols from the entire matrix or a portion of that matrix. In this manner, each time the user is presented with the password or user id matrix, it will most likely will be a different matrix than seen before by that user.

When the second entity goes to the webpage to access his account, rather than having a first box for entering a user id and a second box for entering a password, the second entity is presented with a screen that has a matrix of symbols, images or pictures. The second entity uses his mouse or other device to click on those symbols, images, or pictures that make up his user id and/or password. For more security, the system can be implemented with both user id and password requirements using this method. Moreover, the system can require that the symbols be entered in a particular order or any random order. For example, the password may be a first symbol that resembles an upper case W, a second symbol that resembles the number 3, a third symbol that resembles a flower, a fourth symbol that resembles a cat face, and a fifth symbol that resembles a lower case e. The system can require that the user click on cells in that order ("W" "3" "Flower" "Cat face" "e") or in any order so long as the only five cells clicked consist of those five symbols.

The cells clicked on by the user are coded as matrix positions or cell coordinates rather than the symbols represented on the user's computer screen. Thus clicking on the cells causes the cell coordinates to be transmitted from the second computer to the first computer. The transmission can be as a cell is clicked upon or upon completion of clicking on the symbols for the password. The first computer then receives the matrix positions/cell coordinates and compares that to the matrix position/cell coordinate information stored on the first computer. If the position/coordinates sent from the second computer match the positions/coordinates stored on the first computer, then the user can access the account.

This system offers advantages of not transmitting numbers or letters that can be intercepted and used to hack into someone's account. Moreover, if someone is sent to a pseudo-website, a website that is alleged to be that of the bank or brokerage but is not, it is unlikely that the operator of the pseudo-website will be able to generate an user id and password screen that has the symbols that make up the password and user id. For example, if the password is made up of five symbols and the matrix is four columns by four rows, the matrix will consist of sixteen cells. Five of those cells will be the password symbols. Thus, from all the symbols possible (e.g., 26 upper case letter, 26 lower case letters, numbers up to 99, objects such as a cat face or flower) for a password, the operator will need to select those five to be able to obtain the user's password. As the number of symbols used increases, the likelihood of surreptitiously obtaining the password diminishes. Moreover, if both the password and user id are entered in this manner, the odds diminish further.

In another aspect the invention can be used to increase the likelihood that a password cannot be phished while at the same time decreasing the length of the password. This aspect is based on the steps of providing a universe of characters from which a password can be selected, providing a first smaller subset of the characters from the universe for a user to select from for creating a password, and then, when the user is to enter the password, providing a second subset of the characters from the universe of characters. The second subset of characters will necessarily include some of the characters from the first subset, such as the selected password characters. As the second subset of characters decreases, the users password also can be decreased because doing so will reduce the probability that a phisher will be able to provide a small subset of characters and include the user's password characters within that smaller subset of characters.

As an example of this aspect, the system can be set up with a universe of 1,000 characters. The first subset provided, from which the user creates the password, can be 36 characters (e.g., a 6×6 matrix) from the universe of 1,000 characters. This 36 character matrix can change each time anyone attempts to create a password to ensure that there is more complexity in the system. Then, when the user attempts to logon and enter the previously-selected password, a second subset of the universe of characters can be provided. While this second subset can be up to 1,000 characters, to reduce the likelihood of phishing, the system can provide, for example, a 4×4 matrix (i.e., 16 characters). If the user's password is 4 characters, then of the 16 characters in the second subset of characters 4 of the characters will be characters that must be the password and 12 of the characters are other randomly selected characters which may or may not repeat some of the characters from the password. Or course, an algorithm can be used to select the remaining 12 characters in a manner that ensures some repeat of, or no repeat of, the password characters. Advantageously, as the length of the password is decreased and the size of the second subset of characters is decreased, the likelihood is decreased that a phisher will provide a matrix that includes the password. Moreover, if the password is decreased, it becomes even more unlikely that the phisher will provide the password character(s) from the 1000 characters.

This can be mathematically described using the following equation:

X=available symbols
Y=number of symbols in password
Z=number of symbols on screen $$P\begin{pmatrix} \text{all } Y \text{ password symbols} \\ \text{are among the } Z \\ \text{symbols on the screen} \end{pmatrix} = [C(Y, Y)C(X-Y, Z-Y)]/C(X, Z)$$

$$= C(X-Y, Z-Y)/C(X, Z)$$

$$= C(Z, Y)/C(X, Y)$$

As an example of this equation in use, consider that we have 100 available symbols (X=100), the password contains 3 symbols (Y=3), and the screen displays 9 symbols (Z=9). If these values are placed into the above equation, the following calculation results:

$$\text{with } X = 100, Y = 3, Z = 9$$

$$\text{Probability} = C(3,3)C(97,6)/C(100,9)$$
$$= C(97,6)/C(100,9)$$
$$= C(9,3)/C(100,3)$$
$$= (9*8*7)/(100*99*98)$$
$$= 0.00052$$

Of course the probability can be set at, for example, 1 in 1,000,000 or 1 in 10,000,000 or the like, and the values of X, Y and Z varied to optimize the length of the password.

An advantage of these systems compared to other known systems is that the universe of characters is not limited by a keyboard. Specifically, a keyboard includes 26 letters in upper case or lower case, 10 numbers, and typically 10 symbols (shift-number). Thus, the typical keyboard includes only about 72 characters. Some keyboards contain up to almost 100 characters. In contrast, the systems envisioned herein can optionally and additionally rely upon a much expanded universe of characters beyond numbers (0-9), letters (a-Z) and symbols. For example, the system can use numbers such as 10, 111, 1289 and the like. Similarly, the characters can be any object imaginable. Thus the number of characters can be greater than 72, 98, 100, etc. and as a significant advantage to the provider of the system and its users, a phisher will not be able to rely upon the limited universe of a keyboard's characters to phish a user. Instead, they will need to learn the universe of characters that a particular system includes and then guess a subset of characters to provide to the user to trick the user into entering the password. As the universe of characters increases, the likelihood that the phisher will provide the password decreases. In part, this is due to the size of the universe of characters being too great to physically display on the screen.

In another aspect, the system can rely on passphrases to logon to a system as either or both of the user id and password. The passphrase is designed to address the difficulty that people have in remembering passwords. As the necessity increases to increase password complexity, and the frequency at which they are changed, the ability of the user decreases to remember numerous, regularly changing passwords. For example, a password initially could be as simple as one's name, e.g., "denise." Then systems required that the password further include a number, e.g., "denise1." Then systems required that the password still further include an upper case letter or a character (e.g., shift-5=%). And the system requires that the password be changed regularly. A user with numerous passwords likely will deal with these onerous requirements by taking one or more steps that results in a decrease in password security. For example, a user might choose as their eight character password: qqqqqq1! and then when they are required to change their password go to qqqqqq2@. In other words, they create a password that has no meaning to them but is simple to remember in spite of its complexity and the regular requirement to change it. Such a password is believed to be easily broken by software or guessing.

As another technique to manage one's password, the user might write the passwords on a piece of paper and keep that paper by the computer to readily access them. Again, this allows a thief to find the passwords and greatly reduces the benefit of increasing the complexity of the password. As another technique, the user may just store all the passwords as an electronic document on a computer. If the computer is hacked, the passwords are no longer secure. A passphrase is designed to address varying degrees of success these types of problems encountered by users. It does so, in part, by relying on a user's ability to remember phrases of relevance to a user, as described in more detail below.

A passphrase is herein defined as a phrase of words, numbers and/or characters. For example, a passphrase of words can be "That dog won't hunt" and a passphrase of words and characters can be "That [image of a dog] won't [image of a hunter]" A passphrase is designed to provide users the ability to suggest a phrase that has meaning to them but is unlikely to have the same meaning to another person. For example, a user can identify an event relating to one of their children and use that in a passphrase, e.g., "Peter the Piper likes to kick the ball," "Elizabeth the Niper went swimming" or "William the Swiper speaks French." These passphrases can be combined with images to be "Peter the Piper likes to [image—foot kicking a ball]," "Elizabeth the Niper went [image of a girl swimming]," and "William the Swiper [image of lips and French flag]." While a crook might be able to enter a person's childrens' names or a person's birthday to guess a password, the passphrases techniques described herein are unlikely to be guessed by someone attempting to break into a person's password protected account because they are unlikely to be able to guess this much detail about a user's personal affairs.

In a related aspect of the passphrase, the system can provide the passphrase as images of letters and the images of the other portions of the passphrase and the user must select the passphrase from amongst those images. As another aspect, the system can provide a listing of passphrases from which the user must select his/her correct passphrase. For example, referring to FIG. 2, if the user's passphrase is "Elizabeth went swimming" the system can provide ten image-based passphrases for which an algorithm is used to provide analogous phrases. The degree to which the phrases are analogous can vary. For example, the phrase "Elizabeth went swimming" can be provided along with phrases such as "Elizabeth went biking," "Elizabeth went hiking," "Elizabeth did not go camping," and "Beth went rollerblading." All of these phrases have a certain degree of similarity of structure, content, or words but convey completely different meaning to the user. However, for someone trying to break into an account all of the phrases will appear equally valid.

In many respects, the method of selecting the additional, incorrect passphrases is similar to the method a professor might use to provide the four incorrect answers to a multiple choice question in which five answers are provided. The professor would know that by making a particular mistake a particular answer would result and that would be one answer. The professor would know similarly, and be able to provide, three other potentially plausible answers such that the student has to select from one correct answer and four plausibly correct answers. The algorithm can be similarly configured.

For example, the algorithm can be configured to recognize personal names and then change the correct name to various other names (e.g., Elizabeth would be replaced in some answers by Beth, Eliza, Lizzie, Lizzy, Eli, etc.). Similarly, the algorithm can be configured to recognize verbs and be configured to use similar verbs (e.g., swimming would be replaced in some answers by one or more of biking, hiking, camping, rollerblading, skiing, etc.). Similarly, the algorithm can be configured to recognize other parts of the sentences (e.g., adverbs, nouns, etc.) and use similar articles (e.g., substitute one adverb for another or one noun for another).

As another variation, the passphrase entered may be required to have a grammatical mistake and then the alternative passphrases that appear on the screen also can have grammatical mistakes. In this manner, the system is designed to remove or limit the ability of a person to eliminate a particular passphrase by assuming that it is incorrect based on a grammatical error. This aspect is relevant if one assumes that computer generated passphrases may have grammatical errors within them.

Another advantage of the passphrase is that it can be used in a manner similar to those described above. For example, the system can be configured such that only graphical objects or images are transmitted from the system computer to the user and matrix positions or row numbers are transmitted back from the user to the system upon selection of a passphrase by the user. Of course, the passphrase system can be used much like a conventional password system in which a passphrase can be typed into the system using a conventional alpha-numeric keyboard.

The utility of the systems, methods and techniques described herein are wide and range from online banking and investing to online gaming and gambling as well as any other account that is accessed over the internet, intranet, or similar communication system.

I claim:

1. A method of verifying a user's identity to allow that user to gain access to an account, the method comprising:
   creating a matrix of symbols stored on a first computer based on matrix positions/cell coordinates of each symbol, wherein an identifier of the users identity is represented by less than all of the symbols in the matrix;
   transmitting the matrix of symbols and, optionally, matrix positions/cell coordinates to a second computer;
   presenting the matrix of symbols to a user of a second computer wishing to gain access to an account through the second computer, the matrix being presented as clickable cells configured to be clicked by a computer device;
   transmitting to the first computer the matrix positions/cell coordinates of the cells clicked by the user; and
   comparing the matrix positions/cell coordinates transmitted by the second computer to the matrix positions/cell coordinates stored on the first computer to determine if the identifier of the user's identity was correctly entered.

2. A method of verifying a users identity to allow that user to gain access to an account over the Internet, the method comprising:
   using software programmed on a first computer to create a first matrix of characters of size X; and
   upon logging onto a second computer, displaying on a display associated with the second computer a second matrix of characters of size Z, wherein Y characters represent a preselected password of the user and X>Z>Y, wherein X is greater than the number of letters, numbers and characters on a keyboard.

3. The method of claim 2, wherein the matrix of characters X is greater than 72.

4. The method of claim 2, wherein the matrix of symbols X is greater than 98.

5. The method of claim 2, wherein the matrix of symbols X is greater than 110.

6. The method of claim 2, wherein the probability, P, that the password will be presented in the second matrix is determined by $P=[C(Y,Y)C(X-Y,Z-Y)]/C(X,Z)$.

7. The method of claim 6, wherein the matrix of symbols X is greater than 100.

8. The method of claim 6, wherein the matrix of symbols is greater than 150.

9. A method of verifying a users identity to allow that user to gain access to an account over the Internet, the method comprising:
   using software programmed on a first computer to set a passphrase for the user;
   using software on the second computer to present a display of one or more passphrases, wherein the one or more passphrases comprises the set passphrase and one or more alternative passphrases;
   using software programmed on the second computer to allow the user to select a passphrase from the one or more passphrases, wherein at least one passphrase is the set passphrase; and
   using software programmed on the second computer to allow the user to gain access to the account if the selected passphrase matches the set passphrase.

10. The method of claim 9, wherein the passphrase comprises words.

11. The method of claim 9, wherein the passphrase comprises objects that form a phrase.

12. The method of claim 9, wherein the passphrase comprises words and objects that form a phrase when combined.

13. The method of claim 9, wherein the passphrase comprises graphical objects and/or images.

14. The method of claim 9, wherein the alternative passphrases are configured to be variations on the set passphrase.

15. The method of claim 14, wherein the variation on the set passphrase comprises variation of one or more of a word or object in the set passphrase.

16. The method of claim 15, wherein the word comprises one or more of a noun, a verb, an adverb, an adjective or grammatical object.

* * * * *